(No Model.)

D. PAYNE.
TRACTION WHEEL.

No. 302,020. Patented July 15, 1884.

WITNESSES
Morton Toulmin
Edwin L Bradford

INVENTOR
Daniel Payne
A W Morgan Son
his Attorney's

UNITED STATES PATENT OFFICE.

DANIEL PAYNE, OF SOUTHSIDE, MINNESOTA.

TRACTION-WHEEL.

SPECIFICATION forming part of Letters Patent No. 302,020, dated July 15, 1884.

Application filed February 25, 1884. (No model.)

*To all whom it may concern:*

Be it known that I, DANIEL PAYNE, a citizen of the United States of America, residing at Southside, in the county of Wright and State of Minnesota, have invented certain new and useful Improvements in Devices for Keeping Wheels of Traction-Engines from Slipping, of which the following is a specification, reference being had therein to the accompanying drawings.

This invention relates to improvements in traction-engines, and has for its objects to provide an attachment which may be quickly secured or removed from the periphery of the driving-wheels, which will prevent slipping when the ground is wet, soft, or sandy—as, for instance, in a manure-yard. These objects are attained by the devices illustrated in the accompanying drawings, forming a part of this specification, in which—

Figure 1:
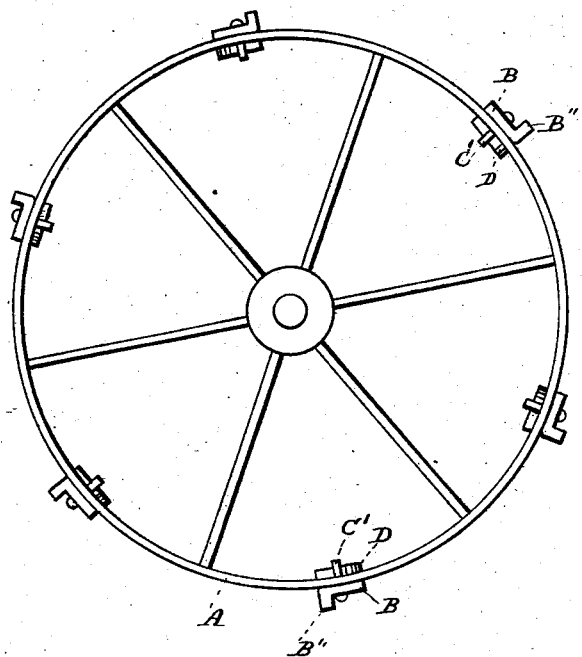
Figure 2:
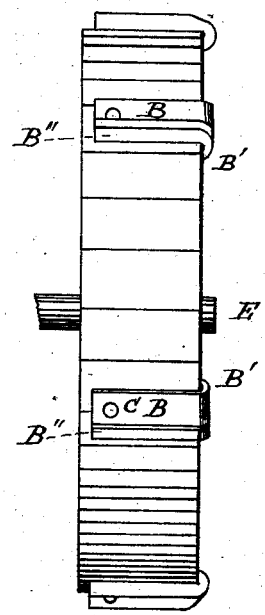
Figure 3:
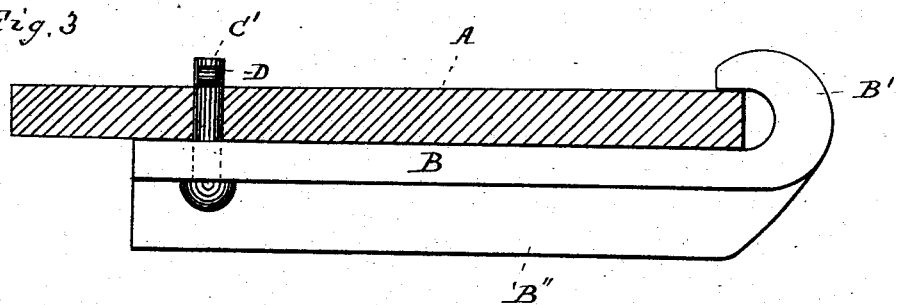
Figure 4:

Figure 1 is an elevation of a wheel having six of these attachments in position. Fig. 2 is an elevation showing the face of a wheel having four of these attachments in sight. Fig. 3 is a detailed view of one of these attachments and a transverse section of the rim or tire of the wheel. Fig. 4 is a view of the split pin.

The letter A indicates a wheel of a traction-engine.

B is the part of the attachment which fits up against the tire of the wheel, and is provided with a hooked portion, B', also a projecting rib or flange, B'', which is intended to enter the yielding surface of the ground. An opening in the part B (shown in dotted lines in Fig. 3) and corresponding openings in the rim or tire of the wheel are intended to receive the bolts C', by means of which the attachment and the rim or tire of the wheel are secured to each other, the bolt having an opening, through which a split pin, D, is inserted to hold the bolt in its place. This construction enables the attachment to be put on or taken off with great facility, as it is only intended to be used when the ground is not firm enough to hold the wheels from slipping. The number of attachments may be varied according to the size of the driving-wheels or other circumstances, five or six being the number I prefer.

The attachment is to be made of metal.

Having described my invention, what I desire to secure by Letters Patent, and claim, is—

In a traction-engine, a cleat, B, having a projecting rib, B'', and hook B', and hole C, adapted to receive a bolt, C', in combination with a wheel, A, having apertures in its face for the passage of said bolt, and the split key, D, as described, and for the purposes set forth.

In testimony whereof I affix my signature in presence of two witnesses.

DANIEL PAYNE.

Witnesses:
CHAS. H. STEVENS,
I. W. CAMERON.